(12) United States Patent
Lu

(10) Patent No.: US 7,522,888 B2
(45) Date of Patent: Apr. 21, 2009

(54) ARCHITECTURE OF FUTURE OPEN WIRELESS ARCHITECTURE (OWA) RADIO SYSTEM

(76) Inventor: Wei Lu, 1218 Bubb Rd., Cupertino, CA (US) 95014

( * ) Notice: Subject to any disclaimer, the term of this patent is extended or adjusted under 35 U.S.C. 154(b) by 366 days.

(21) Appl. No.: 11/277,914

(22) Filed: Mar. 29, 2006

(65) Prior Publication Data

US 2007/0105587 A1   May 10, 2007

(51) Int. Cl.
*H04B 1/40* (2006.01)
(52) U.S. Cl. .................... 455/84; 455/550.1; 455/418; 455/419; 370/469; 370/470; 370/473
(58) Field of Classification Search ................. 455/418, 455/419, 84, 562.1, 550.1; 370/469, 470, 370/473, 474, 477, 484, 506, 512
See application file for complete search history.

(56) References Cited

U.S. PATENT DOCUMENTS

2005/0195744 A1* 9/2005 Ryan et al. .................. 370/235
2007/0207792 A1* 9/2007 Loving ........................ 455/418

* cited by examiner

*Primary Examiner*—Tuan A Pham

(57) ABSTRACT

Architecture of future open wireless architecture (OWA) radio system supporting full integration of multi-bands, multi-standards wireless and mobile communication technologies with computer technology based on future open architecture platforms.

9 Claims, 4 Drawing Sheets

Architecture of Future OWA Radio

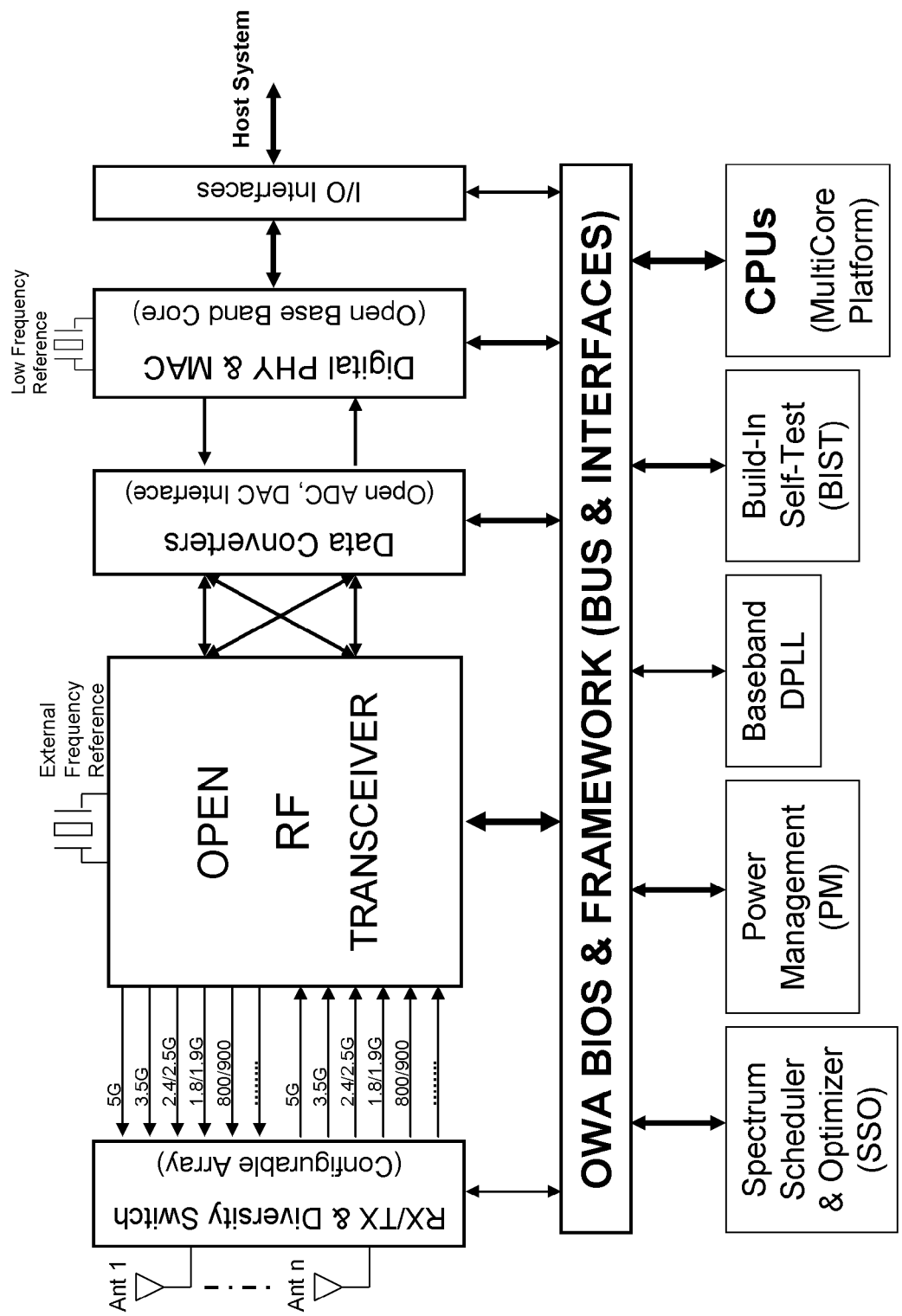
FIG.1 Architecture of Future OWA Radio

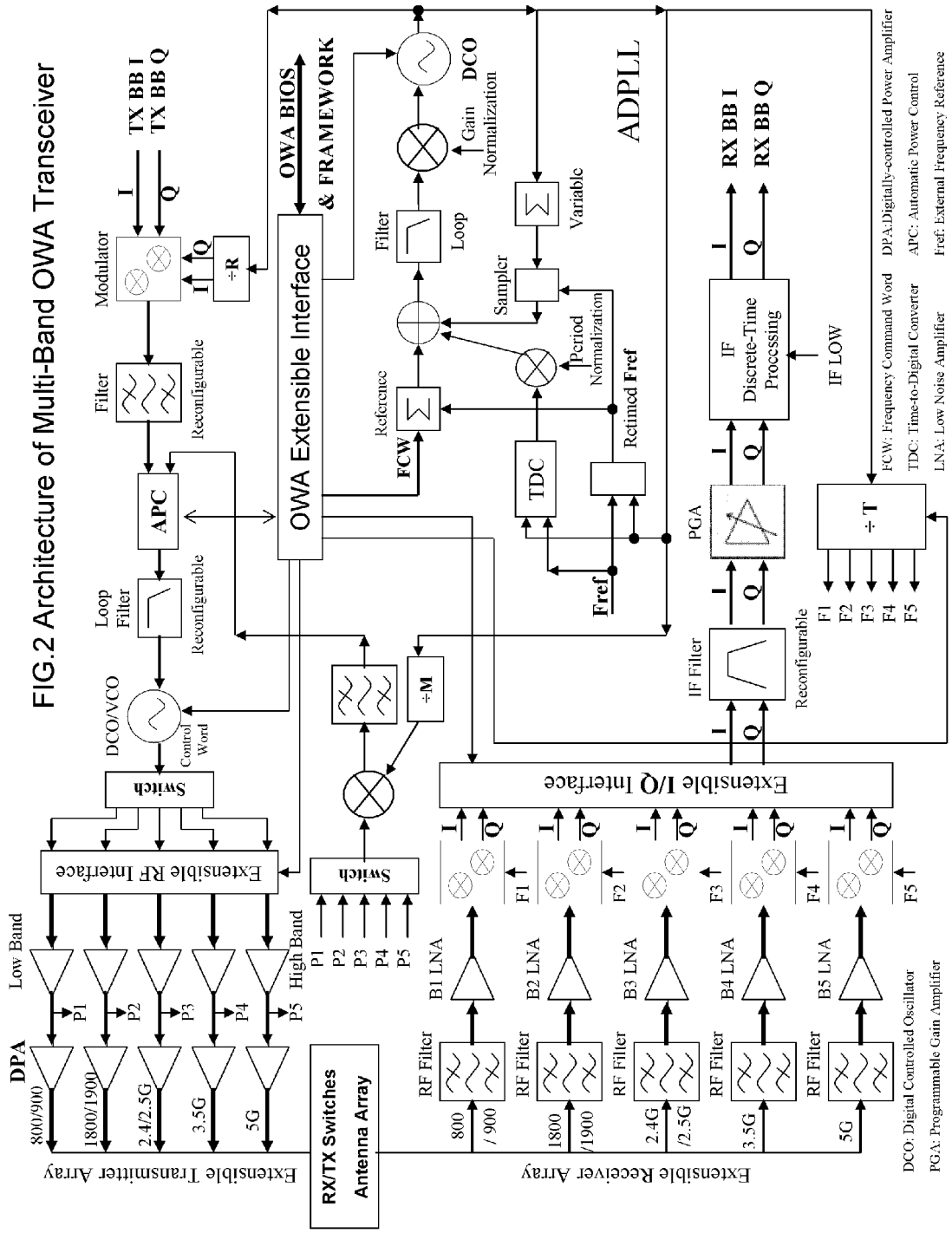
FIG.2 Architecture of Multi-Band OWA Transceiver

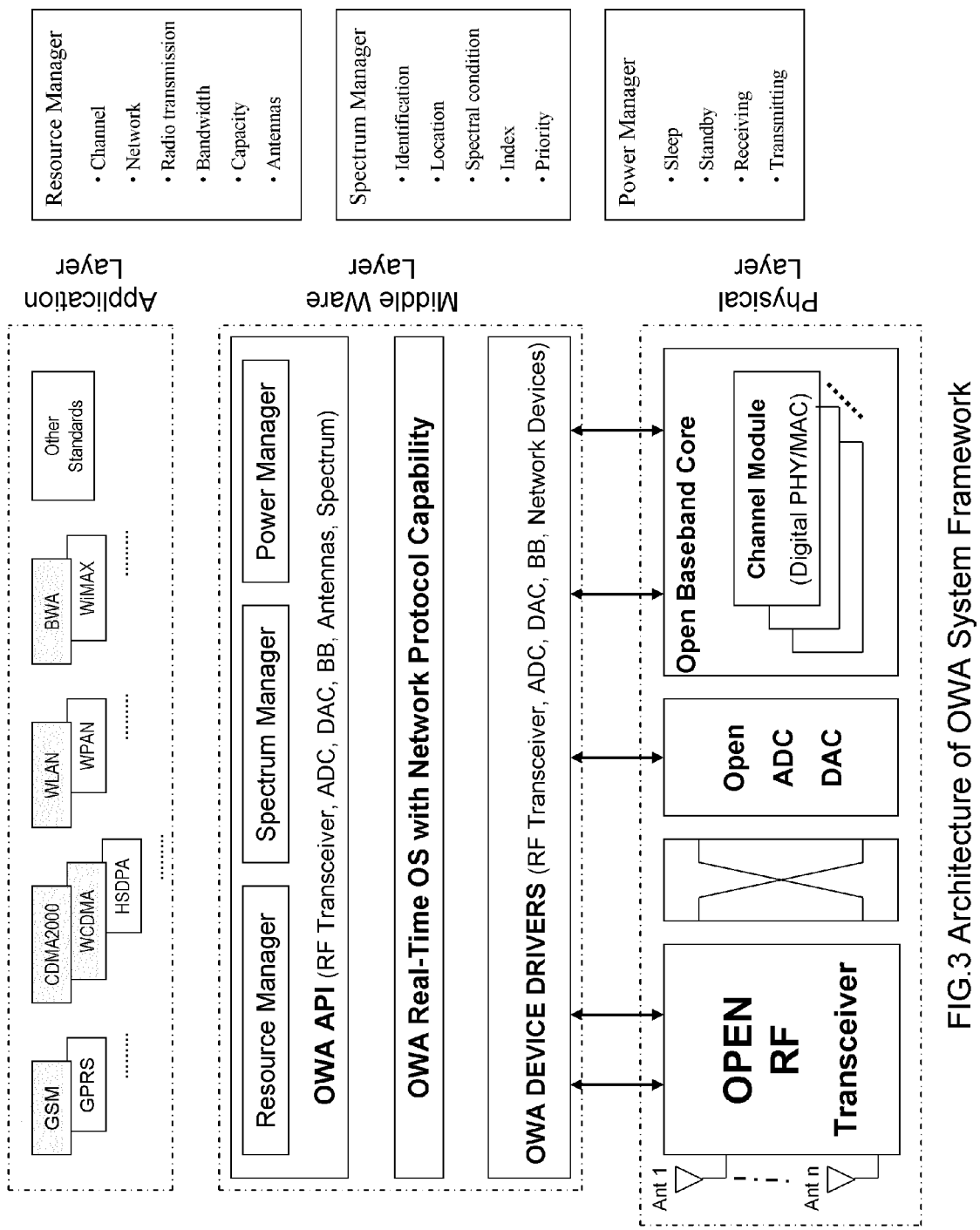
FIG.3 Architecture of OWA System Framework

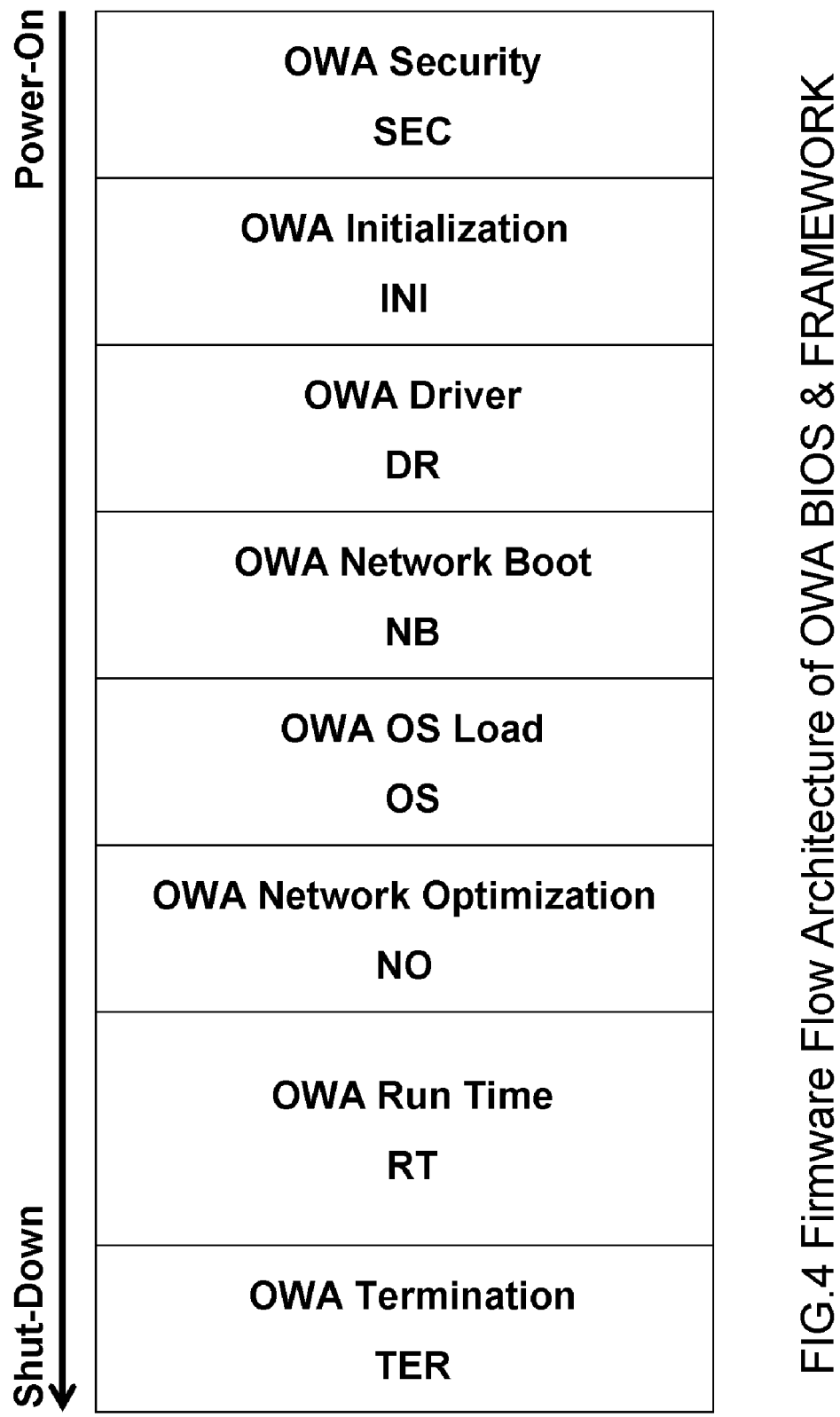
FIG.4 Firmware Flow Architecture of OWA BIOS & FRAMEWORK

ARCHITECTURE OF FUTURE OPEN WIRELESS ARCHITECTURE (OWA) RADIO SYSTEM

BACKGROUND OF THE INVENTION

1. Field of the Invention

This invention relates to an open architecture of future radio system supporting multi-bands, multi-standards wireless and mobile communications and enabling extensibility and upgradeability of the system modules including, but not limited to, radio frequency transceiver, data converter and base-band processing core, wherein the open system platforms are based on the open wireless architecture (OWA) BIOS (basic input/output system) and framework definitions. This OWA system platform is an optimal integration of future computer architecture with the next generation wireless and mobile communications technology.

2. Description of the Related Art

With the proliferation of wireless standards in television, radio and mobile communications, compatibility issues have emerged in wireless networks and systems. Inconsistency between wireless standards is causing problems to subscribers, wireless network operators and equipment vendors. Subscribers are forced to change their handsets whenever the latest breed of standards is introduced. Network operators face the dilemma during the upgrade of a network from one generation to another due to the presence of a large number of subscribers using legacy handsets incompatible with newer generations of standards. Equipment vendors face difficulty in airing new technology because of short time-to-market requirements. Inconsistency between wireless standards is inhibiting deployment of global roaming facilities and causing problems in introducing new features and services. Users are expecting more from their mobile terminals in terms of quality of service and multimedia applications. Traditional wireless systems, with their capabilities hard-coded in them, are no longer able to keep step with this brisk growth rate.

Open Wireless Architecture (OWA) technology is the solution to the issues mentioned here. The term OWA refers to the open broadband platform, both in radio frequency (RF), baseband, network and application, that can support diverse communication standards and can integrate multiple wireless networks and systems into one common platform. To achieve this flexibility and extensibility, OWA focuses on all aspects of a communication system such as RF section, baseband processing and application domains. The flexibility and adaptability required for the converged wireless platform can be achieved by implementing the radio functionality as software modules running on a generic platform or by using extensible hardware modules.

OWA helps in realizing global roaming facilities. It allows the network operators and subscribers to use third party solutions on their systems and to customize their systems according to their liking. Using OWA we can build systems which support multiple standards, multiple bands, multiple modes and offer diverse services to its user.

However, OWA is much different from Software Defined Radio (SDR) because OWA has the following important features:

a) Different parts from different vendors, and encourage third-party vendors to develop add-on products,
b) Allow users to upgrade the hardware in all of the OWA hardware and components,
c) The system is based on open interfaces so that users can easily develop their own products and applications upon the OWA platform,
d) The application hardware modules are "plug and play", independent with the basic OWA infrastructure.

In a word, OWA is different from SDR because OWA basically maps various wireless standards into open interface parameters and maintain the system platform including RF, baseband, networks and applications an open architecture. Hence, in OWA systems, different modules (both hardware and software) can be from different vendors which are similar to the open computer architecture in personal computer system and open network architecture in packet router system.

However, SDR is only a radio in which the operating parameters including inter alia frequency range, modulation type, and/or output power limitations can be set or altered by software. Though SDR has been improved a lot to support re-configurability and flexibility, it is only a closed architecture in coupling different radios into one broadband transceiver. In other words, SDR consumes much more power and spectrum in exchange of the system flexibility. From the business point of view, SDR is not a cost-effective solution in commercial wireless communications.

Cognitive Radio is also different from OWA because the cognitive radio is a radio which has the capability of sensing and adapting to the environment and spectrum automatically and intelligently. However, cognitive radio is not an open system from the architecture point of view, and does not meet the requirements of the open system definition.

With this OWA architecture, the key system units including RF transceiver, CPU (central processing unit) platform and base-band processing core are fully open and extensible, especially the open RF transceiver can be operable in either statically allocated spectrum bands, or in dynamically optimized spectrum bands based on spectrum sharing and spectrum recycling techniques which maximize the spectrum utilization.

With this OWA architecture, many system modules including, but not limited to, the RF front-end module, Digital controlled oscillator module, Build-In Self-Test module, Data converter module and Base-band core module can be replaced, extended and upgraded by the users, and developed by the third-party vendors.

In conclusion, as I said in Stanford University in June 2004, the future radio is first, a Computer, then an open wireless architecture (OWA) terminal.

SUMMARY OF THE INVENTION

This invention is directed to an architecture of future open wireless architecture (OWA) radio system which provides an open, extensible, reconfigurable and upgradeable system platform supporting multi-bands, multi-standards wireless and mobile communication technologies, either in the statically allocated frequency spectrum bands or in the dynamically optimized spectrum bands based on spectrum sharing and spectrum recycling techniques, wherein the main system units and modules including RF transceiver and base-band core are upgradeable and plug-and-play through the OWA BIOS (basic input/output system) and Framework open interface definitions.

The architecture of future open wireless architecture (OWA) radio system of the present invention incorporates an OWA BIOS (basic input/output system) AND FRAMEWORK architecture which defines the open bus and interfaces architecture to manage the "plug and play" open architecture of the whole OWA radio systems, as well as provides the extensibility and upgradeability of the different system units and functional modules.

More specifically, the architecture of future open wireless architecture (OWA) radio system of the present invention comprises the utilization of OWA BIOS and Framework, as set forth above, constructing the Open RF (radio frequency) Transceiver, wherein multi-bands transmitters array and multi-bands receivers array are reconfigurable and upgradeable through OWA extensible interfaces, defined by aforementioned OWA BIOS and Framework. Further specifically, the architecture of future open wireless architecture (OWA) radio system of the present invention incorporates such Open RF Transceiver, of the type set forth above, operative in multiple common frequency bands such as 5 GHz, 3.5 GHz, 2.4 GHz/2.5 GHz, 1.8 GHz/1.9 GHz and 800 MHz/900 MHz, but not limited thereto, capable of short range wireless communications, wireless local area networks as well as large area cellular mobile communications. Furthermore, the Open RF Transceiver, as set forth above, is also operative in dynamically allocated spectrums, such as spectrum sharing and spectrum recycling, but not limited thereto. More specifically, the Open RF Transceiver, as set forth above, comprises an All-Digital Phase Lock Loop (ADPLL) as wideband frequency synthesizer, but not limited hereto, in supporting multi-bands transceiver array architecture, as illustrated above.

The architecture of future open wireless architecture (OWA) radio system of the present invention incorporates a multi-cores processing platform with well-defined targets from algorithmic, software and architecture standpoint for the OWA system, wherein different functional modules such as, but not limited to, aforementioned Open RF Transceiver, Data Converter, Open base-band processing Core, Antenna Array and Build-In Self-Test, are capable of operating separately and in parallel, facilitating extensible and reconfigurable system platform, as set forth in details above.

The architecture of future open wireless architecture (OWA) radio system of the present invention also incorporates the layered OWA system framework, as set forth in part above, comprising the physical layer framework including, but not limited to, the aforementioned open RF transceiver, open ADC/DAC (analog-to-digital converter and digital-to-analog converter), the aforementioned open base-band core and antenna array; middle ware layer framework including, but not limited to, OWA device drivers supporting aforementioned RF transceiver, ADC/DAC, baseband core and network devices, OWA real-time OS (operating system) with network protocol capability and OWA API (application programming interface) supporting underlying physical layer system units; application layer framework supporting the services and applications of different wireless transmission technologies. Furthermore, the OWA API, as set forth above, is in charge of high layer system management including, but not limited to, resource management (channel, network, bandwidth, capacity and antenna), spectrum management (band identification, location, spectral condition, index and priority) and power management (sleep mode, standby mode, receiving mode and transmitting mode).

In addition to the above, the architecture of future open wireless architecture (OWA) radio system of the present invention also include the firmware flow architecture capabilities of the OWA BIOS and Framework, as set forth above, comprising the task modules such as, but not limited to, OWA Security, OWA Initialization, OWA Drivers, OWA Network Boot, OWA OS Load, OWA Network Optimization, OWA Run-Time and OWA Termination, wherein such architecture is capable of integrating the future wireless architecture with the computer architecture to construct the OWA future radio system. As set forth above, the firmware flow architecture may be pre-established and determined based on current technological standards and may vary greatly.

One advantage of the architecture of future open wireless architecture (OWA) radio system of the present invention which may serve as an incentive is the concept of "spectrum sharing and spectrum recycling". More specifically, the system provides the capability of users and providers to utilize the existing common frequency bands through the extensible transceiver array, as set forth above, or to search for the available spectrum, both licensed or unlicensed, based on spectrum management, as set forth in details above, wherein the system provides real-time view of available spectrum resource.

Other features of the architecture of future open wireless architecture (OWA) radio system of the present invention comprise the open RF transceiver, as set forth above, whether incorporating cellular mobile technology, local wireless access technology, short-distance wireless technology or its equivalent, including a network searching capability wherein searching for different air interfaces in certain bands based on various criteria such as, but not limited to, signal strength, waveform, frequency, coding and modulation, and whenever necessary, the aforementioned open RF transceiver can replace its transceiver array with other portable "plug-and-play" components such as, but not limited to, Digital Power Amplifier and RF Receiver Front-End.

These and other features and advantages of the present invention will become more clear when the drawings as well as the detailed description are taken into consideration.

BRIEF DESCRIPTION OF THE DRAWINGS

For the full understanding of the nature of the present invention, reference should be made to the following detailed descriptions with the accompanying drawings in which:

FIG. 1 is the architecture of the future Open Wireless Architecture (OWA) radio system, supporting multiple wireless standards in an integrated and converged open common platform.

FIG. 2 is the architecture of multi-band OWA transceiver, integrating all existing and future wireless transmission technologies into one open radio platform.

FIG. 3 is the architecture of OWA system framework, illustrating the main functions across the different implementation layers.

FIG. 4 is the firmware flow architecture of OWA BIOS and Framework, describing the main processing tasks from Power-On to Shut-Down of the OWA system.

Like reference numerals refer to like parts throughout the several views of the drawings.

DESCRIPTION OF THE PREFERRED EMBODIMENT

The present invention relates to an implemental and commercial multi-band common wireless and mobile communication platform for the future open wireless architecture radio system.

FIG. 1 is the architecture of future OWA radio of the present invention. The key system units are:

Open RF (Radio Frequency) Transceiver—it converts the high frequency radio signal into the low frequency or intermediate frequency signal, and vice versa. It also demodulates the radio signal into the base-band signal, and vice versa. This transceiver is designed for open architecture which means the whole transmitting and receiving pipes support multi-bands and multi-standards wireless transmission technologies including existing and future over-the-air radio technologies.

Receiver/Transmitter(RX/TX) and Diversity Antenna Switch—it contains the configurable antenna arrays and the antenna technologies of space and time diversity, including (but not limited to) the smart antenna technology, digital beam forming technology, Multi-Input and Multi-Output (MIMO) technology and antenna calibration technology.

The aforementioned Open RF Transceiver and RX/TX unit support multi-bands of radio frequency spectrum including around 5 GHz band, 3.5 GHz band, 2.4 GHz/2.5 GHz band, 1800 MHz/1900 MHz band, and 800 MHz/900 Mhz band, covering the common radio air interfaces of WLAN (wireless local area network), WPAN (wireless personal access network), BWA (broadband wireless access) and mobile cellular networks, such as GSM (global services for mobile communications), GPRS (GSM packet radio service) and CDMA (code division multiple access), but not limited thereto.

Data Converters—it converts the analog frequency signal into the digital data stream, and vice verse. These converters are designed with open architecture platform based on OWA interfaces so that the converters can be reconfigurable, upgradeable and in plug-and-play mode.

The connection between the aforementioned Open RF Transceiver and Data Converters is a cross network matrix to support the future convergence and integration of RF transceiver and digital conversion, for example, ADC (Analog to Digital Converter) and DAC (Digital to Analog Converter) will be integrated into the RF Transceiver system. In other words, the boundary of digital processing should be moved as close as possible to the antenna, and thus for the OWA radio system, the typical place for ADC and DAC is in the aforementioned Open RF Transceiver.

Digital PHY (physical layer) and MAC (medium access control layer)—it constructs the open base band processing core to process various transmission algorithms, access control protocols and resource management protocols, etc. It is an open and common base-band processing platform for the OWA system.

OWA BIOS (basic input/output system) and Framework—it defines the OWA bus architecture and interfaces architecture to manage the "plug and play" open architecture of the whole OWA system. It also schedules the operations of the different functional modules and units of the OWA radio system.

CPU (central processing unit)—it is a multi-cores processing platform which have well-defined targets from algorithmic, software and architecture standpoint for the OWA system, as well as best combinations of system optimizations and algorithms for future requirements on security, privacy, usability and reliability.

Spectrum Scheduler and Optimizer (SSO)—it manages the dynamic spectrum sharing and spectrum recycling technologies for maximizing the spectrum utilization in OWA system. Dynamic spectrum management is extremely important for future wireless communications because it provides real-time view of available spectrum resource, and makes use of the spectrum more efficiently, productively and flexibly.

Power Management (PM)—it optimizes the power consumption and power scheduling across the whole functional units of the OWA system. It also defines the best-effort solutions for the terminal power manager on different operation modes: Sleep, Standby, Receiving and Transmitting.

Build-In Self-Test (BIST)—it is an important system unit for self testing, operation and maintenance (O&M) debugging, performance and evaluation testing of the OWA system. It is also one of the necessary tasks in the system initialization process.

Other functional units include Input/Output (I/O) interface and Base-band Digital Phase Lock Loop (DPLL) which are required in the design of the OWA radio system.

The aforementioned OWA BIOS and Framework is the most important implemental core platform to design this OWA radio system because:
1. it defines the common bus and interface architectures to enable each functional unit of the system the "plug and play" feature in the OWA radio implementation;
2. it converges and integrates the OWA system with the computer architecture platform.

In conclusion, as I said in Stanford University in June 2004, the future radio is first, a Computer, then an open wireless architecture (OWA) terminal.

FIG. 2 is the architecture of multi-band OWA transceiver of the present invention, wherein the key components include:

All-Digital Phase Lock Loop (ADPLL)—it is a future-proven, all-digital PLL frequency synthesizer for wireless and mobile communications comprising:
  Digitally-Controlled Oscillator (DCO)
  Time-to-Digital Converter (TDC)
  Digital loop filter and digital reconfigurable filter In addition, ADPLL has wideband frequency generation and modulation capability than traditional PLL, and its phase signal can not be corrupted by noise, resulting in better phase noise performance.

Extensible Receivers (RX) Array—it is designed as portable RF (radio frequency) front-end modules with open architecture so that user can change and upgrade this RF part freely. The array is operable from low band (800 MHz) to high band (5 GHz) supporting major wireless transmission technologies in the market. Based on different frequency detected and generated from aforementioned ADPLL, this RF module demodulates and/or converts the incoming RF signal into intermediate frequency (IF) band or low frequency band. The aforementioned RX Array connects to the proceeding OWA receiving pipe through Extensible I/Q Interface.

Extensible Transmitter (TX) Array—it is designed as portable RF (radio frequency) front-end modules with open architecture so that user can change and upgrade this RF part freely. The array is operable from low band (800 MHz) to high band (5 GHz) supporting major wireless transmission technologies in the market. The DPA (Digitally-controlled Power Amplifier) module is a highly efficient RF sub-system controlled via Digital Control Bits (DCB) by the OWA BIOS & Framework, as set forth above. The aforementioned TX Array connects to the other parts of the OWA transmitting pipe through Extensible RF Interface. The power control of the aforementioned TX Array is executed by the Automatic Power Control (APC) module.

The aforementioned ADPLL, RX Array, TX Array, APC and DCO are all controlled by OWA BIOS and Framework, as set forth above, through OWA Extensible Interface.

The filters in both the receiving pipe and transmitting pipe are reconfigurable supporting OWA platform.

The "Fref" in the aforementioned ADPLL is an external frequency reference of the OWA multi-band RF transceiver, as set forth above. The FCW (frequency command word) in the aforementioned ADPLL is provided through the aforementioned OWA Extensible Interface.

Receiver/Transmitter (RX/TX) Switches and Antenna Array—it is the external RF hardware to support smart antennas technology, space and time diversity technology and transmission calibration technology, but not limited thereto.

FIG. 3 is the architecture of OWA system framework of the present invention, wherein the layered architecture comprising:

Physical Layer—It contains the Open RF Transceiver module, Open ADC/DAC module and Open Base-band Core module as well as Antenna Array, as set forth in details above. The aforementioned Open Base-band Core module further includes many Channel Modules dealing with digital PHY/MAC processing of different wireless transmission technologies. The aforementioned Open RF Transceiver module and the Open ADC/DAC module are connected each other by cross network matrix, as set forth above in FIG. 1. For future OWA system, the typical place for aforementioned ADC/DAC is in the aforementioned open RF transceiver.

Middle Ware Layer—it comprises three major sub-layers: OWA Device Drivers Sub-Layer, OWA Real-Time OS (Operating System) Sub-Layer and OWA API (Application Programming Interface) Sub-Layer.

The aforementioned OWA Device Drivers Sub-Layer further includes drivers for aforementioned RF transceiver, ADC, DAC, Base-Band core and network devices which are directly connected with the underlying physical layer.

The aforementioned OWA Real-Time OS Sub-Layer contains the network protocol capability.

The aforementioned OWA API Sub-Layer supports programming capability for underlying aforementioned RF transceiver, ADC, DAC, Base-band core, antenna array and the spectrum allocation which is very important for specialized system task management including resource manager, spectrum manager and power manager.

The aforementioned resource manager handles the system resource management on channel, network, radio transmission, bandwidth, capacity and antenna array.

The aforementioned spectrum manager handles the spectrum band management on band identification, band location, spectral condition, spectrum index and band priority.

The aforementioned power manager handles the system power management and power scheduling when and how the OWA terminal should be in sleep mode, standby mode, receiving mode or transmitting mode.

Application Layer—it supports the services and applications of different wireless transmission technologies, and also constructs the open service oriented architecture platform (OSA) for users to define various applications upon the OWA open system.

FIG. 4 is the firmware flow architecture of the aforementioned OWA BIOS & Framework of the present invention, wherein the key task modules comprising:

OWA Security (SEC) performing the functions of user and equipment registration, authentication and verification, etc.

OWA Initialization (INI) process including CPU initialization, chipset initialization, memory initialization, module initialization, network searching initialization, I/O (input/output) device discovery, bus & interface initialization as well as resource management.

OWA Drivers (DR) providing the OWA framework architecture with its extensibility to:
 1. meet requirements from a range of wireless platforms
 2. incorporate new initiatives and fixes as well as new hardware
 3. support modular software architecture The aforementioned OWA Drivers can be developed at different times by different organizations. The OWA BIOS & Framework, as set forth above, defines powerful solutions for sequencing the aforementioned OWA Driver execution, abstracting the aforementioned OWA Driver interface, and managing shared resources. The OWA BIOS & Framework and the OWA Drivers, as set forth above, may optionally be cryptographically validated before use to ensure that a chain of trust exists from radio power-on until the OWA BIOS boots, OWA Interfaces activate, and beyond.

The aforementioned OWA Initialization and OWA Drivers can be deployed as separately constructed open modules. The modules are collected in a storage abstraction referred to as a Software Definable Module (SDM), which can be used to describe the platform nonvolatile storage among other technologies.

These open modules, including INI and DR as set forth above, interface to the system and each other via Callable OWA interfaces that are named by global identifiers (GIDs). This GID is a 128-bit value guaranteed to be statistically unique. This uniqueness allows for extensible service creation without limitation or collision among different standards and platform-specific services.

The design-by-interface nature of OWA BIOS & Framework, as set forth above, decouples the software abstractions from the particular micro-architecture and platform topologies in traditional wireless and mobile communications terminal system. As such, the aforementioned OWA framework can be ported to any mobile wireless system as well as embedded telecommunications systems.

The OWA BIOS & Framework, as set forth above, is also used to support Build-In Self Test (BIST), as set forth in FIG. 1, for the platform initialization (in power-on mode) and platform optimization (in operation mode).

OWA Network Boot (NB) processing series of wireless networks related processing including, but not limited to:
 1. spectrum searching and dynamic spectrum scheduling
 2. wireless networks searching and updating
 3. resource management and dynamic bandwidth allocation
 4. network access control and configuration
 5. wireless transmission convergence and establishment
 6. boot management and optimization Similar to the aforementioned OWA Drivers, this OWA Network Boot is an open system module which can be reconfigurable among other platforms and technologies. The module is also in charge of selection of different boot devices of the OWA system.

OWA OS (operating system) Load (OS) providing high-layer processing of transient OS loading, API (application program interface) and GUI (graphical user interface) loading, and final OS loading, etc.

The aforementioned OWA OS Load is designed to be extensible, enabling the addition of revolutionary new services to the aforementioned OWA BIOS & Framework functions easily.

The aforementioned OWA OS Load is an open architecture design supporting common OS modules and user-defined solutions.

OWA Network Optimization (NO) performing the following processing of the OWA wireless networks, but not limited to:
 1. spectrum optimization and sharing management
 2. network performance testing and optimization
 3. network re-selection, switching and reconfiguration
 4. wireless transmission optimization and calibration The aforementioned OWA Network Optimization validates the system performance and the network performance, and optimizes the spectrum utilization, transmission capacity and Quality of Services (QoS).

OWA Run-Time (RT) running system applications and user applications of the OWA platform.

OWA Termination (TER) triggering the system termination process comprising, but not limited to:
1. push application data to stack and memory
2. save user data to internal and external memory
3. update the network Operation and Maintenance (O&M)
4. release the network resource and spectrum allocation In summary, the OWA BIOS & Framework, as set forth above, is a set of robust architectural interfaces which provides a way to build open platform firmware via modular components. It has been designed to enable the wireless industry and customers to accelerate the evolution of innovative, differentiated and open platform designs.

The architecture of future open wireless architecture (OWA) radio system of the present invention is not meant to be limited to the aforementioned prototype system platform and architecture, and the subsequent specific description utilization and explanation of certain characteristics previously recited as being characteristics of this prototype system platform are not intended to be limited to such technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. Architecture of layered open wireless architecture (OWA) system framework, said system comprising:
  a) Physical layer framework including antenna array (Extensible Receivers Array and Extensible Transmitter Array), open RF transceiver, Data Converters (open ADC (analog to digital converter) and DAC (digital to analog converter)), open base-band core (Digital PHY (physical layer) and MAC (medium access control layer)), defined by OWA architecture;
  b) Middle Ware layer framework including OWA device drivers, OWA real-time OS (operating system) with network protocol capability, OWA API (application programming interface), wherein said OWA API comprising the system management modules of:
    a) Resource Manager optimizing OWA system resources of channel, network, radio transmission, bandwidth, capacity and antennas,
    b) Spectrum Manager handling the spectrum band management on band identification, band location, spectral condition, spectrum index and band priority,
    c) Power Manager utilizing the system power management and power scheduling when and how the OWA system is optimized for sleep mode, standby mode, receiving mode or transmitting mode; and
  c) Application layer framework supporting the services and applications of different wireless transmission technologies, and also constructing the open service oriented architecture platform for users to define various applications upon the OWA radio system.

2. The system as recited in claim 1, wherein said Open RF Transceiver supporting multi-bands of radio frequency spectrum around 5 GHz band, 3.5 GHZ band, 2.4 GHz/2.5 GHz band, 1800 MHZ/1900 MHz band, 800 MHz/900 MHz band as well as dynamic spectrum allocation based on spectrum sharing and spectrum recycling technologies by the Spectrum Manager.

3. The systems as recited in claim 1, wherein said Open RF Transceiver and said Data Converter connecting each other by a cross network matrix to support the integration of RF transceiver and digital conversion for the future OWA radio, the boundary of digital processing should be moved as close as possible to the antenna, and for future OWA system, the typical place for said ADC and said DAC is in the said Open RF Transceiver unit.

4. The system as recited in claim 1, wherein said Digital PHY and MAC constructing the open OWA base-band processing core to process various transmission algorithms, access control protocols and resource management protocols.

5. The systems as recited in claim 1, wherein said Open RF Transceiver, said Data Converter and said Digital PHY & MAC designed with open architecture platform based on said OWA BIOS & Framework supporting reconfigurable, upgradeable and plug-and-play features.

6. The system as recited in claim 1, wherein said Extensible Receiver Array connecting to the proceeding OWA receiving units through Extensible I/O Interface controlled by said OWA BIOS and Framework through OWA Extensible Interface.

7. The system as recited in claim 1, wherein said Extensible Transmitter Array connecting to the other OWA transmitting units through Extensible RF Interface controlled by said OWA BIOS and Framework through OWA Extensible Interface.

8. The system as recited in claim 1, wherein said OWA Device Drivers comprising drivers for said open RF transceiver, said ADC and DAC, said open base-band core and network devices.

9. The system as recited in claim 1, wherein said OWA API comprising programming interfaces for said open RF transceiver, said ADC and DAC, said open base-band core, antenna array and spectrum allocation.

* * * * *